United States Patent Office 3,400,245
Patented Sept. 3, 1968

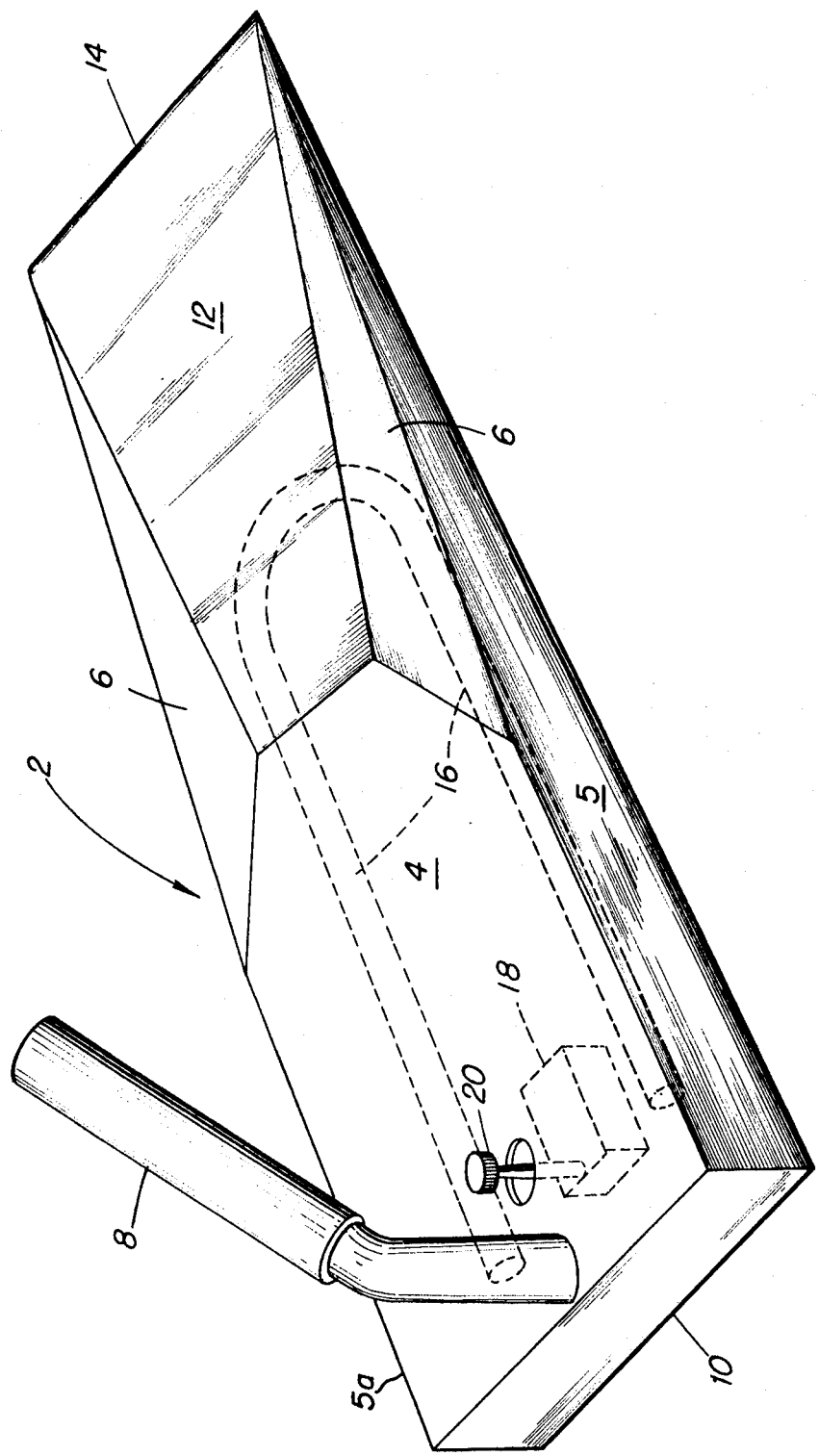

3,400,245
SADIRON
Charles D. Burgess, Macon, Ga., assignor, by mesne assignments to Giffen-Burgess Corp., a corporation of Delaware
Filed Sept. 15, 1967, Ser. No. 668,145
5 Claims. (Cl. 219—245)

ABSTRACT OF THE DISCLOSURE

A sadiron which has an elongated body with parallel side margins and a lower flat sole plate surface. The top surface of the body has an afterportion which slopes in the direction of the sole plate and which is at least in part a planar surface extending to and terminating in common co-extensive juncture with a transverse trailing edge of the body. Additionally, the body may be provided with side walls of a contoured character and which extend inwardly from the side margins of the body and merge with the sloping afterportion of the body top surface, the side walls being themselves flat surfaces which diminsh in width in the direction of the trailing edge of the body.

---

The present invention relates to a sadiron, more particularly to a heated sadiron for face-seaming strips of carpeting, or the like, to present a seamless upper surface.

Although the sadiron of the present invention can be used for most any purpose for which sadirons can be used, it is particularly suitable and preferred for use in the application of tape for the seaming of strips of floor covering, such as carpeting. A tape most suitable for this purpose is disclosed in my co-pending application Ser. No. 599,414, filed Dec. 6, 1966.

Face-seaming of carpeting with a seaming tape, such as is disclosed in my above-identified application, involves the positioning of the seaming tape on a substrate, most often the base upon which the carpet is to be laid, then positioning over the tape, in abutting relationship, the strips of carpeting to be joined by seaming, and then bending the adjacent, abutting edges of the strips of carpeting to be seamed upwardly and outwardly for access by a sadiron, and melting the thermoplastic adhesive on the tape by the heat from the sadiron. As the sadiron is moved along the tape, immediate relocation of the abutting edges of the carpeting has to be accomplished by lowering them into the molten adhesive before it has an opportunity to cool and lose its tackiness. The operation requires careful coordination and the cooperation of several persons, because simultaneous attention has to be paid to the gradual progress of the sadiron in alignment with the tape, and to the accurate repositioning of the abutting edges, to prevent their overlap as well as prevent the occurrence of an excessive gap, to obtain a uniformly well concealed abutted seam. The operation is complicated by the fact that the abutting edges of the strips of carpeting to be seamed have to be lowered into the still tacky adhesive immediately after the sadiron has moved away from a particular point of the tape. In carrying out the aforementioned process, outside of the need for simultaneous cooperation between a plurality of operating personnel, the biggest difficulty is encountered generally in the need to simultaneously move the iron forward along a predetermined line promptly upon passage of the iron, lower the edges of both strips into the still tacky but rapidly setting hot-melt adhesive, as well as ascertain and establish the optimum relative placement of the edges of the strips of carpeting to be joined. Regardless of the relative placement of the edges in advance of using the sadiron, the rather radical interference with the positioning of the edges caused by the moving of a sadiron of the prior art therebetween, accompanied by the upward and outward bending of the edges of carpeting, results in disturbing and shifting the optimum relationship between the abutting edges of carpeting, whereby the carpeting has to be repositioned, as outlined above. This operation is most critical, because the principal purpose of face-seaming wall-to-wall carpeting is completely to obscure the location of a seam and render the joint strips of carpeting to appear as if the carpet would be of a completely seamless structure. Stay tacks have been used in the prior art as a means to prevent the occurrence of a relative shift between the strips of carpeting to be joined. In addition to the obvious undesirability of the additional manipulative steps of applying and removing these tacks, their use often results in misalignment and related problems, as well as provide a potential source of damage to the carpet and the underlying surfaces.

Another difficulty encountered in the face-seaming of carpeting with thermoplastic adhesives is that as the heating iron arrives to the end of the seam which is is to be made, it generally abuts against a vertical boundary of the area in which the carpet is being laid, such as a wall, divider, and the like. At this point the sadiron cannot be moved further in a horizontal direction and, therefore, it must be tilted upwardly for its removal from between the tape and the strips of carpeting to be joined. The time required for this removal is very close to that period during which the thermoplastic adhesive still remains tacky, therefore, the removal of the iron must be accomplished within a very brief time to allow the accurate relative repositioning of the end portions of the abutting edges of the strips of carpeting to be seamed within the short time during which good adhesion can still be achieved while the adhesive is still tacky. Consequently, this sensitive end portion of the seam is often inadequately completed due to either an insufficient bond strength occasioned by the belated contact between the adhesive and the bottoms of the strips of carpeting to be seamed, or the seam at this end portion turns out as frequently appearing unattractive due to an overly large gap between or an overlapped relationship of the abutting edges of carpeting.

It is an object of the present invention to provide a sadiron of a structure and configuration greatly contributing to elimination of the problems encountered with prior art sadirons, when used for the face-seaming of carpeting with a seaming tape with hot-melt adhesives.

In accordance with the invention a sadiron is provided having a body with sole plate, and heating means for the body, the improvement which comprises said body having a sloping aftersurface disposed relative to the sole plate at a maximum angle of 30 degrees.

The invention is further disclosed in greater detail with reference being had to the sole figure of the application, showing a perspective view of an embodiment of the sadiron of the present invention.

In the drawing there is shown a sadiron 2 having a body 4 with parallel side margins 5, 5a, and a pair of contoured sidewalls 6. A handle 8 is attached right at or near the leading edge 10 of the body. The body 4 has an afterportion 12 provided with a gently sloping surface and terminating in a trailing edge 14. Means for providing heat to the iron 2 is shown in dotted lines. This can conveniently comprise an electrical resistance heating element 16 equipped with a thermostat 18 for maintaining the temperature desired for any given circumstance. The thermostat 18 can be of a variable type wherein the temperature to be maintained can be adjusted such as with an adjusting button 20.

The top surface of the afterportion 12 is gently tapered from the top of the body 4 towards the horizontal plane of the flat bottom or sole plate of the sadiron. I have found that the angle enclosed between the aftersurface and the horizontal sole plate cannot exceed 30 degrees, preferably 18 degrees. A steeply sloping aftersurface, such as one enclosing an angle of over 30 degrees with the sole plate, would delay contact between the bottom of the strips of carpeting to be seamed and the hot-melt adhesive to a period well after the iron ceased to contact the seaming adhesive, at a time when the adhesive has lost most or all of its tackiness and resulting in an imperfect bond. Excessively large angles also contribute to imperfect and nonuniform seaming, wrinkles and gaps between the edges which should be abutting. The trailing edge 14 can be a more or less sharp edge, in which case the location of the apex of the angle coincides with the trailing edge. Alternatively, the trailing edge 14 can be rounded or otherwise terminate at a point somewhat short of the location where the apex would be located.

The leading edge 10 of the body 4 is suitably blunt, with the handle 8 being secured to the body immediately at or just adjacent to the leading edge. While a handle is not essential, it is considered as a preferred component for most convenient manual face-seaming uses. I have found that removal of the sadiron from under the carpeting is greatly facilitated by securing the handle at or adjacent to the leading edge. The handle would be the only portion of the sadiron which, when in use, projects through the abutting edges of carpeting to be seamed, to above the top surface of the carpet. When the iron arrives to the end of the seam and abuts against a vertical obstruction, such as a wall, the iron has to be tilted upwardly for removal from under the strips of seamed carpeting. The handle is one of the first portions of the iron to thus be removed from between the seamed strips of carpeting, when mounted at or in close proximity to the front of the body. This facilitates creation of a perfect seam even at the end thereof and allows the outward passage of the sadiron from under the strips of carpeting under conditions whereby the strips of carpeting are not displaced from their normal, in-place position, to the substantial extent which would exist in the case of removing an iron in which the handle would be mounted at some distance behind the leading edge.

The handle can be entirely omitted if desired, and the locomotion of the sadiron can be provided by a drawing wire situated entirely underneath the strips of carpeting to be seamed. In accordance with a yet further embodiment of the sadiron of the present invention, the supply of electric power to the heating element 16 can be provided by means of a drawing cable also capable of simultaneously being used to pull the iron along the length of the seam to be created. In forgoing the use of the handle, however, the operation of the seaming process has to be carried out by exercising care to guide the sadiron substantially accurately along the line of the seam to be made, and over the seaming tape.

The sadiron of the present invention should be of substantial length, for best results. Depending on the amount of heat communicated to the hot-melt adhesive through the sole plate, and the amount and characteristics of the adhesive, the sole plate has to be in contact with a particular point of the tape for a certain length of time, to accomplish satisfactory melting of the adhesive. The rate of travel of the sadiron of the present invention can be further increased by making the sadiron of substantial length. This results in the maintenance of sufficient contact between the heated sole plate and a particular spot of the hot-melt adhesive on the seaming tape, making possible the increase in seaming speed. For example, in a preferred embodiment of the present invention, the total length of the iron is 10.5 inches, with a width of about 3 inches, the latter to obtain a sufficiently wide seam. An iron of this length can be conveniently moved at the rate of about 2½ to 3 feet per minute. The maximum permissible rate of travel can be easily determined. The rate of travel can be increased until substantial resistance is encountered due to unmolten or still overly viscous material. If there is no substantial resistance, this signifies that there is sufficient dwell time provided for the adhesive-melting sole plate surface upon the adhesive.

Weight, cost, and other practical factors would limit the maximum desirable length of an iron according to the present invention. At a practical length in the vicinity of about 10 inches, and for a body thickness of about between ½ inch and 1¼ inch, the point at which the top surface of the iron will begin to slope rearwardly, forming the aftersurface 12, is most suitably at about halfway or slightly beyond the half of the entire length of the iron. The controlling factor is the aforementioned angle between the sole plate and the aftersurface 12, the actual length of the aftersurface will be determined by the actual length of the iron 2 and the thickness of the body 4.

In the preferred embodiment of the sadiron of the present invention shown in the drawing, the contoured sidewalls 6 serve to provide an additional factor facilitating the transition in the travel of the bottoms of the strips of carpeting to be joined, over the entire top surface of the iron. It is to be understood that it is within the contemplation of the invention to encompass the provision of a great variety of top surface configurations, as long as the gently slanting aftersurface 12 is provided as an essential and critical feature of the iron.

While the width of the iron should preferably not be narrower than about 2½ inches to provide a bond sufficiently wide for adequate seam strength, there are also some practical considerations which suggest limiting the maximum width of the iron. Depending on the amount of the hot-melt adhesive used for seaming, the adhesive will have a greater or lesser tendency to spread in a lateral direction. Lateral spreading cannot be well controlled in the case of using excessively wide irons. It can be further aggravated by the presence of excessive amounts of hot-melt adhesive. This condition could bring about undesirable soiling of subadjacent surfaces as well as of bottom portions of carpeting more remote from the edges. By use of a sadiron according to the invention having certain predetermined maximum widths, it can be assured that the lateral spreading of hot-melt adhesive will be limited, at most, to a very slight lateral distance beyond the edges of the sadiron. This can be accomplished by the fact that most hot-melt adhesives do harden within a relatively small temperature range so that any hot-melt adhesive flowing past the edges of the sadiron will harden very shortly after having flown away from the heated zone.

In the most preferred embodiments of the invention the upper surfaces of the body 4 contacting the underside of the edgemost portions of the strips of carpeting to be seamed, are not thermally insulated and have approximately the same sensible temperature as that of the sole plate. The bottom portions of the carpeting, which contact the hot top surfaces of the body, will become heated as a consequence of such contact. Upon these carpet edges being lowered from the aftersurface 12, beyond the trailing edge 14, into the tacky hot-melt adhesive behind the iron, the hot-melt adhesive will not be immediately quenched and thereby lose its tackiness. In accordance with this preferred feature of the present invention, the heated undersurfaces of the carpeting will muffle the hot, molten adhesive and maintain it in a fluid condition for a slightly longer period after the passing of the iron, thereby to accommodate the operator to meet possible unexpected need for making occasional readjustments in the relative positions of the abutting edges of the carpeting to be seamed.

As shown in the drawing illustrative of the preferred embodiment of the present invention, if a handle is to be used, the portion of the handle adjacent to its point of attachment, such as to the body 4, is laterally most suitably as narrow as possible, at least throughout such part of the handle which corresponds to the thickness of the highest pile carpeting which can be expected to be seamed. The overall desirable result from the use of the sadiron of the present invention is to dislocate the edges of the strips of carpeting from their ideal, present relative position, only as slightly as would be unobjectionable for the seaming process. By the use of a narrowbottomed handle as the only element of the sadiron which projects through between the edges of the carpeting to be seamed the edges will be moved apart only to the very slightest extent. The use of a flat shaped projection at the lowermost portions of the handle also facilitates the accurate guidance and alignment of the sadiron in the direction of the tape and the seam to be made.

I claim:

1. A sadiron comprising an elongated body having parallel longitudinal side margins and a lower flat surface constituting a sole plate, said body having a heating element therein, said body also having a top surface and transverse leading and trailing edges at opposite ends thereof extending between said side margins, said top surface having an afterportion at least a part of which is a planar surface sloping in the direction of said sole plate, said planar surface extending to and terminating in common co-extensive juncture with said trailing edge, the angle included between the planar surface part of said afterportion and said sole plate being not greater than thirty (30) degrees.

2. The sadiron according to claim 1 wherein the angle included between the planar surface part of said afterportion and said sole plate is substantially eighteen (18) degrees.

3. The sadiron acording to claim 1 further comprising a handle attached to said body at substantially said leading edge and extending a distance above said body, the upper part of said handle having relatively thicker dimension than the lower part thereof.

4. A sadiron comprising an elongated body having parallel longitudinal side margins and a lower flat surface constituting a sole plate, said body having a heating element therein, said body also having a top surface and transverse leading and trailing edges at opposite ends thereof extending between said side margins, said top surface having an afterportion at least a part of which is a planar surface sloping in the direction of said sole plate, said planar surface extending to and terminating in common co-extensive juncture with said trailing edge, the angle included between the planar surface part of said afterportion and said sole plate being not greater than thirty (30) degrees, said body further having contoured sidewalls inclined inwardly of the longitudinal margins of said body adjacent to and merging with the afterportion of said body top surface, each of said sidewalls comprising an essentially flat surface which diminishes in width in the direction of said trailing edge.

5. The sadiron according to claim 1, said body being further provided with sidewalls inclined inwardly and upwardly from the respective longitudinal side margins and each sidewall merging with said afterportion.

References Cited

UNITED STATES PATENTS

| | | | |
|---|---|---|---|
| 757,139 | 4/1904 | McLaughlin | 38—88 |
| 1,924,523 | 8/1933 | Spring. | |
| 1,924,551 | 8/1933 | Higgins. | |
| 2,017,478 | 10/1935 | Stoffel | 38—88 |
| 2,084,625 | 6/1937 | Stebbins et al. | 156—391 X |
| 2,164,085 | 6/1939 | Rossen. | |
| 2,241,067 | 5/1941 | Holm-Hansen. | |
| 2,484,566 | 10/1949 | Hiller et al. | |

RICHARD M. WOOD, *Primary Examiner.*

C. L. ALBRITTON, *Assistant Examiner.*